US011733218B2

(12) United States Patent
Srinivasan (10) Patent No.: US 11,733,218 B2
(45) Date of Patent: Aug. 22, 2023

(54) AUTOMATED VALVE SWITCHING SETUP FOR ION CHROMATOGRAPHY (IC) THAT FACILITATES EQUILIBRATION OF CONSUMABLES OR ALLOWS FOR NORMAL IC OPERATION

(71) Applicant: DIONEX CORPORATION, Sunnyvale, CA (US)

(72) Inventor: Kannan Srinivasan, Tracy, CA (US)

(73) Assignee: Dionex Corporation, Sunnyvale, CA (US)

( * ) Notice: Subject to any disclaimer, the term of this patent is extended or adjusted under 35 U.S.C. 154(b) by 99 days.

(21) Appl. No.: 17/469,579

(22) Filed: Sep. 8, 2021

(65) Prior Publication Data

US 2023/0071525 A1 Mar. 9, 2023

(51) Int. Cl.
*G01N 30/38* (2006.01)
*G01N 30/86* (2006.01)

(52) U.S. Cl.
CPC ......... *G01N 30/8658* (2013.01); *G01N 30/38* (2013.01)

(58) Field of Classification Search
CPC ............................. G01N 30/8658; G01N 30/38
See application file for complete search history.

(56) References Cited

U.S. PATENT DOCUMENTS

| 4,900,446 | A | * | 2/1990 | Anderson | ............... | B01D 15/18 |
| | | | | | | 73/61.52 |
| 5,958,227 | A | * | 9/1999 | Uematsu | ............... | G01N 30/468 |
| | | | | | | 210/659 |
| 8,101,422 | B2 | | 1/2012 | Srinivasan et al. | | |
| 8,597,571 | B2 | * | 12/2013 | Riviello | ................. | G01N 30/96 |
| | | | | | | 210/198.2 |
| 10,948,466 | B2 | | 3/2021 | Srinivasan et al. | | |
| 2005/0266580 | A1 | * | 12/2005 | Italiano | ................ | G01N 31/005 |
| | | | | | | 422/78 |
| 2006/0186046 | A1 | * | 8/2006 | Liu | ........................ | G01N 30/62 |
| | | | | | | 204/518 |

(Continued)

FOREIGN PATENT DOCUMENTS

CN 106645502 A 5/2017

OTHER PUBLICATIONS

"A Valve Switching Ion Chromatography System With Integrated Automation Management" DIONEX, Sep. 2006, 6 pages.

(Continued)

*Primary Examiner* — David J Bolduc (57) ABSTRACT

A chromatography system includes an electrolytic eluent generator; a first valve configured to switch between an operating position which directs an output of the electrolytic eluent generator to a continuously generated trap column and a waste position which directs the output of the electrolytic eluent generator to waste; the continuously regenerated trap column; a degasser; a sample injector including a sample injector valve assembly, the sample injector valve assembly configured to switch between an operation mode which directs an output of the degasser to a separation column, a load mode which loads a sample onto the separation column, and a regenerant mode which directs the output of the degasser to a regenerant line; the separation column; a suppressor; and a detector.

19 Claims, 6 Drawing Sheets

(56) References Cited

U.S. PATENT DOCUMENTS

| | | | |
|---|---|---|---|
| 2007/0062876 A1* | 3/2007 | Srinivasan | G01N 30/96 |
| | | | 210/660 |
| 2007/0065343 A1 | 3/2007 | Srinivasan | |
| 2009/0211979 A1* | 8/2009 | Srinivasan | G01N 30/96 |
| | | | 210/656 |
| 2017/0234782 A1* | 8/2017 | Srinivasan | G01N 30/96 |
| | | | 436/161 |
| 2019/0107518 A1* | 4/2019 | Srinivasan | G01N 30/96 |
| 2021/0178334 A1 | 6/2021 | Zhongqing et al. | |

OTHER PUBLICATIONS

Jack et al. "A Valve Switching Ion Chromatography System with Integrated Automation Management" American Laboratory, Oct. 20, 2015, 4 pages.

* cited by examiner

AUTOMATED VALVE SWITCHING SETUP FOR ION CHROMATOGRAPHY (IC) THAT FACILITATES EQUILIBRATION OF CONSUMABLES OR ALLOWS FOR NORMAL IC OPERATION

FIELD

The present disclosure generally relates to the field of ion chromatography (IC) including automated valve switching setup for equilibration of consumables or normal IC operation.

INTRODUCTION

Ion chromatography (IC) is a widely used analytical technique for the determination of anionic and cationic analytes in various sample matrices. Ion exchange-based consumables need to be equilibrated prior to being deployed into operation in an ion chromatography setup. These consumables include eluent generators, continuously regenerated trap columns, analytical and guard columns, suppressors and other consumables that have ion exchange functionalities. The proper equilibration requires special plumbing setup. The consumables need equilibration typically upon first time installation or after the system has been shut down for a long time.

SUMMARY

In a first aspect, a chromatography system can include an electrolytic eluent generator, a first valve, a continuously regenerated trap column, a degasser, a sample injector, a separation column, a suppressor, and a detector. The electrolytic eluent generator can be configured to electrolytically produce an eluent. The first valve can be configured to switch between an operating position which directs an output of the electrolytic eluent generator to a continuously generated trap column and a waste position which directs the output of the electrolytic eluent generator to waste. The continuously regenerated trap column can be configured to remove ionic contaminants from the eluent. The degasser can be configured to remove residual gas from the eluent. The sample injector can include a sample injector valve assembly. The sample injector valve assembly can be configured to switch between an operation mode which directs an output of the degasser to a separation column, a load mode which loads a sample onto the separation column, and a regenerant mode which directs the output of the degasser to a regenerant line. The separation column can be configured to chromatographically separate components of a sample. The suppressor can be configured to reduce the eluent conductivity. The detector can be configured to detect the presence of components of the sample.

In various embodiments of the first aspect, the sample injector valve assembly can include a three position valve to switch between an operation position corresponding to the operation mode, a load position corresponding to the load mode, and a regenerant position corresponding to the regenerant mode.

In various embodiments of the first aspect, the sample injector valve assembly can include a second valve to switch between a first operate position which directs an output of the degasser to a third valve and a load position which directs the sample onto the separation column; and a third valve to switch between a second operate position which directs an output of the second valve to the separation column and a regenerant position which directs the output of the second valve to a regenerant line.

In various embodiments of the first aspect, the chromatography system can further include a check valve on the regenerant line.

In various embodiments of the first aspect, the chromatography system can further include a flow restrictor between the first valve and waste.

In various embodiments of the first aspect, the chromatography system can further include a controller, wherein the controller can be configured to switch the first valve to the waste position during an electrolytic eluent generator equilibration time period. In particular embodiments, the controller can be further configured to switch the second valve to the regenerant position during a continuously regenerated trap column equilibration time period.

In various embodiments of the first aspect, the chromatography system can further include a third valve configured to switch between an operating position which directs the output of the separation column to the suppressor and a waste position which directs the output of the separation column to waste. In particular embodiments, the chromatography system can further include a controller, wherein the controller can be configured to switch the third valve to the waste position during a separation column equilibration time period.

In various embodiments of the first aspect, the suppressor can be a chemical suppressor.

In various embodiments of the first aspect, the suppressor can be an electrolytic suppressor. In particular embodiments, the chromatography system can further include a fourth valve configured to switch between an operating position which directs the output of the detector to a regenerant line and a waste position which directs the output of the detector to waste. In particular embodiments, the chromatography system can further include a controller, wherein the controller can be configured to switch the fourth valve to the waste position during a suppressor equilibration time period.

In a second aspect, a method can include switching a first valve to a waste position which directs the output of an electrolytic eluent generator to waste; flowing liquid through the electrolytic eluent generator for an electrolytic eluent generator equilibration time period; switching the first valve to an operating position which directs the output of an electrolytic eluent generator to a continuously regenerated trap column; switching a second valve downstream of the continuously regenerated trap column to a regenerant position which directs a downstream flow from the continuously regenerated trap column to a regenerant line; flowing liquid through the continuously regenerated trap column for a continuously regenerated trap column equilibration time period; switching the second valve to an operation position which directs the downstream flow to a separation column; and validating the operation of the chromatography system.

In various embodiments of the second aspect, the method can further include switching a third valve to a waste position which directs the output of the separation column to waste; flowing liquid through the separation column for a separation column equilibration time period; and switching the third valve to an operating position which directs the output of the separation column to a suppressor.

In various embodiments of the second aspect, the suppressor can be a chemical suppressor.

In various embodiments of the second aspect, the suppressor can be an electrolytic suppressor. In particular embodiments, the method can further include switching a fourth valve to a waste position which directs the output of a detector to waste; flowing liquid through a suppressor to the detector for a suppressor equilibration time period; and switching the fourth valve to an operating position which directs the output of the detector to a regenerant line. In particular embodiments, the method can further include providing an alternate regenerant flow to the suppressor during the suppressor equilibration time period.

In a third aspect, a method can include switching a valve to an equilibrate position which directs the output of an electrolytic consumable device to waste or a regenerant line; flowing liquid through the electrolytic consumable device for an electrolytic consumable device equilibration time period; switching the first valve to an operating position; and validating the operation of the chromatography system.

In various embodiments of the third aspect, the electrolytic consumable device can include an electrolytic eluent generator.

In various embodiments of the third aspect, the electrolytic consumable device can include a continuously regenerated trap column.

In various embodiments of the third aspect, the electrolytic consumable device can include a separation column.

In various embodiments of the third aspect, the electrolytic consumable device can include an electrolytic suppressor.

DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

The proper equilibration of ion exchange-based consumables, such as eluent generators, continuously regenerated trap columns, analytical and guard columns, and suppressors, requires a special plumbing setup and is generally implemented manual implemented manually and as a separate setup prior to analysis. The consumables typically need equilibration upon first time installation and after the system has been shut down for a long time.

The systems and methods disclosed herein solve multiple issues related to the equilibration of ion exchange-based consumables. Upon first time install, the system can take several days to install and achieve acceptable performance due to the various equilibration routines that need to be performed as prescribed for the consumables. Subsequent replacement of consumables by a user would require hands on time to ensure that the consumables are equilibrated per the written procedures. Additionally, system performance can be compromised after the system is restarted after an extended shut down. To achieve good performance some level of equilibration is needed and adds to the hands-on time. Further, the pressure contribution of the various consumables may not be readily apparent and needs additional steps from the users for diagnosis.

Figure 1:
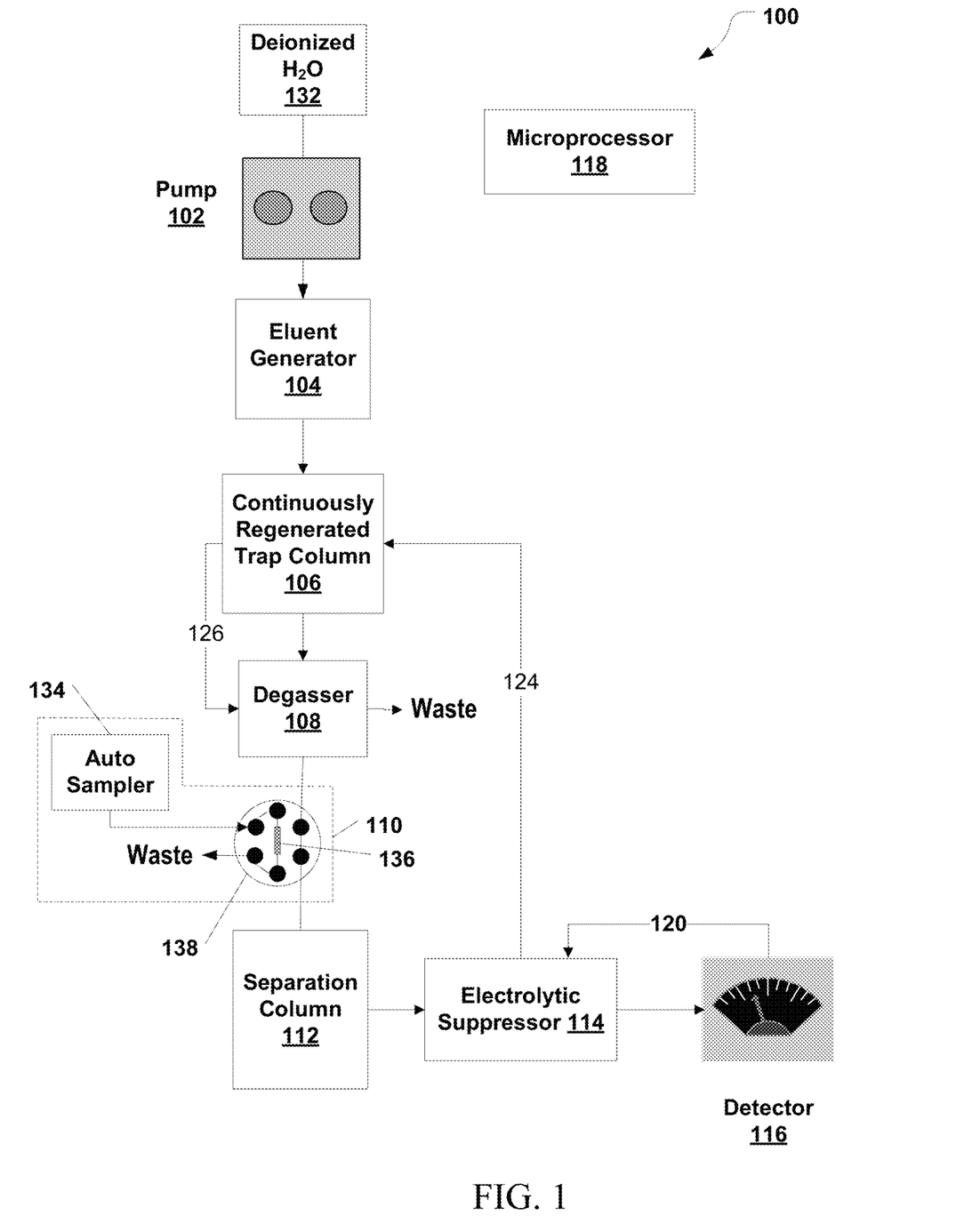
FIG. 1 illustrates an exemplary chromatography system, in accordance with various embodiments.

FIG. 1 illustrates an embodiment of a chromatography system 100. Chromatography system 100 may include a pump 102, an electrolytic eluent generator 104, a continuously regenerated trap column 106, a degasser 108, a sample injector 110, a chromatographic separation device 112, an electrolytic suppressor 114, a detector 116, and a microprocessor 118. Chromatographic separation device 112 may be in the form of a capillary column or an analytical column. Line 120 may be used to transfer the liquid from an output of detector 116 to the regenerant channel inlet of the electrolytic suppressor 114. Line 124 may be used to transfer liquid from an outlet of the regenerant channel of the electrolytic suppressor 114 to an inlet of the regenerant channel of the continuously regenerated trap column 106. Recycle line 126 can be optionally used to transfer liquid from an outlet of the continuously regenerated trap column 106 to an inlet of the degasser 108 or can be directed to waste. Liquid from the outlet of the degasser 108 when configured with the flow from the regenerant flow from the continuously regenerated trap column can be directed to waste 128.

Pump 102 can be configured to pump a liquid from a liquid source 132, such as deionized water, and be fluidically connected to electrolytic eluent generator 104. Pump 102 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 102 may be in the form of a high-pressure liquid chromatography (HPLC) pump. In addition, pump 102 can also be configured so that the liquid only touches an inert portion of pump 102 so that a significant amount of impurities does not leach out. In this context, significant means an amount of impurities that would interfere with the intended measurement. For example, the inert portion can be made of polyether ether ketone (PEEK) or at least coated with a PEEK lining, which does not leach out a significant amount of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Electrolytic eluent generator 104 is configured to generate a generant. A generant refers to a particular species of acid, base, or salt that can be added to the eluent. In an embodiment, the generant may be a base such as cation hydroxide or the generant may be an acid such as carbonic acid, phosphoric acid, acetic acid, methanesulfonic acid, or a combination thereof.

Referring to FIG. 1, eluent generator 104 can be configured to receive the liquid from pump 102 and then add a generant to the liquid. The liquid containing the generant can be outputted from eluent generator 104 to an inlet of continuously regenerated trap column 106.

Continuously regenerated trap column 106 is configured to remove cationic or anionic contaminants from the eluent. Continuously regenerated trap column 106 can include an ion exchange bed with an electrode at the eluent outlet. An ion exchange membrane stack can separate the eluent from a second electrode and contaminate ions can be swept through the ion exchange membrane stack towards the second electrode. The ion exchange membrane stack can include one or more ion exchange membranes. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane.

Degasser 108 may be used to remove residual gas. In an embodiment, a residual gas may be hydrogen and oxygen. Degasser 108 may include a tubing section that is gas permeable and liquid impermeable such as, for example, amorphous fluoropolymers or more specifically Teflon AF. The flowing liquid can be outputted from degasser 108 to sample injector 110 with a substantial portion of the gas removed.

Sample Injector 110 can be used to inject a bolus of a liquid sample into an eluent stream. The liquid sample may include a plurality of chemical constituents (i.e., matrix components) and one or more analytes of interest. The sample injector 110 can include an auto sampler 134, sample loop 136, and a multiport valve 138. The auto sampler 134 can draw a sample from a sample container. The multiport valve 138 can be in a first position to allow the sample to fill the sample loop 136 to the desired volume. After the sample loop 136 is filled, the multiport valve can switch to a second position and the eluent stream can drive the sample onto the chromatographic separation device 112.

Chromatographic separation device 112 can be used to separate various matrix components present in the liquid sample from the analyte(s) of interest. Typically, chromatographic separation device 112 may be in the form of a hollow cylinder that contains a packed stationary phase. As the liquid sample flows through chromatographic separation device 112, the matrix components and target analytes can have a range of retention times for eluting off of chromatographic separation device 112. Depending on the characteristics of the target analytes and matrix components, they can have different affinities to the stationary phase in chromatographic separation device 112. An output of chromatographic separation device 112 can be fluidically connected to electrolytic suppressor 114.

Electrolytic suppressor 114 can be used to reduce eluent conductivity background and enhance analyte response through efficient exchange of eluent counterions for regenerant ions. Electrolytic suppressor 114 can include an anode chamber, a cathode chamber, and an eluent suppression bed chamber separated by ion exchange membranes. The anode chamber and/or cathode chamber can produce regenerate ions or transport supplied regenerant ions. The eluent suppression bed chamber can include a flow path for the eluent separated from the regenerant by an ion exchange barrier and eluent counterions can be exchanged with regenerate ions across the ion exchange barrier. An output of electrolytic suppressor 114 can be fluidically connected to detector 116 to measure the presence of the separated chemical constituents of the liquid sample.

Detector 116 may be in the form of ultraviolet-visible spectrometer, a fluorescence spectrometer, an electrochemical detector, a conductometric detector, mass spectrometry detector or a combination thereof.

An electronic circuit may include microprocessor 118, a timer, and a memory portion. In addition, the electronic circuit may include a power supply that are configured to apply a controlling signal, respectively. Microprocessor 118 can be used to control the operation of chromatography system 100. Microprocessor 118 may either be integrated into chromatography system 100 or be part of a personal computer that communicates with chromatography system 100. Microprocessor 118 may be configured to communicate with and control one or more components of chromatography system such as pump 102, pump 130, eluent generator 104, sample injector 110, and detector 116. The memory portion may be used to store instructions to set the magnitude and timing of the current waveform with respect to the switching of sample injector 110 that injects the sample.

Ion exchange materials upon first time install or long-term storage can bleed leachates that can be oligomeric or ionic in nature. Since these compounds can be retained in downstream ion exchange components they can cause delay in system startup time and in some instances can overwhelm the capacity of the downstream components causing performance issues such as lower the sensitivity, retain peaks of interest causing poor peak shapes, increase background and the noise. The solution to the above issue is to equilibrate the consumables by following prescribed protocols and usually these are done to the consumables on an individual basis and then replumbed into the system prior to usage. These are additional steps the users have to perform and adds to hands on time. Every time a consumable has to be replaced on the IC system, the replacement consumable needs to be equilibrated prior to use and this aspect also adds to significant down time and labor. Not pursuing the required equilibration steps can contaminate downstream consumables with leachates and can lead to significant performance issues and additional down time. Errors in following the prescribed steps can also add to the system down time. Issues with system startup after a delayed shutdown period can also be a common problem encountered in the field.

Additionally, it can be desirable to measure the pressure contribution of the consumables to the overall system pressure as an indicator of some issue with that consumable and compromised performance. With electrolytic devices that have separate regenerant pathways that contain electrodes, this pathway also needs to be replumbed and flushed with reagents or water containing streams in order to prepare the consumable to be deployed on the system for standard operation. Facilitating the regeneration aspect is another challenge from a plumbing configuration perspective and presently requires hands on time by the user. These issues can be addressed with a valving scheme that allows easy deployment of the equilibration method and the system can resume normal operation after the execution of the required steps to insure excellent performance of the IC system. While the discussed embodiments show specific valve configurations it is apparent from this disclosure that other valve configurations can be used that are available in the industry.

Figure 2:
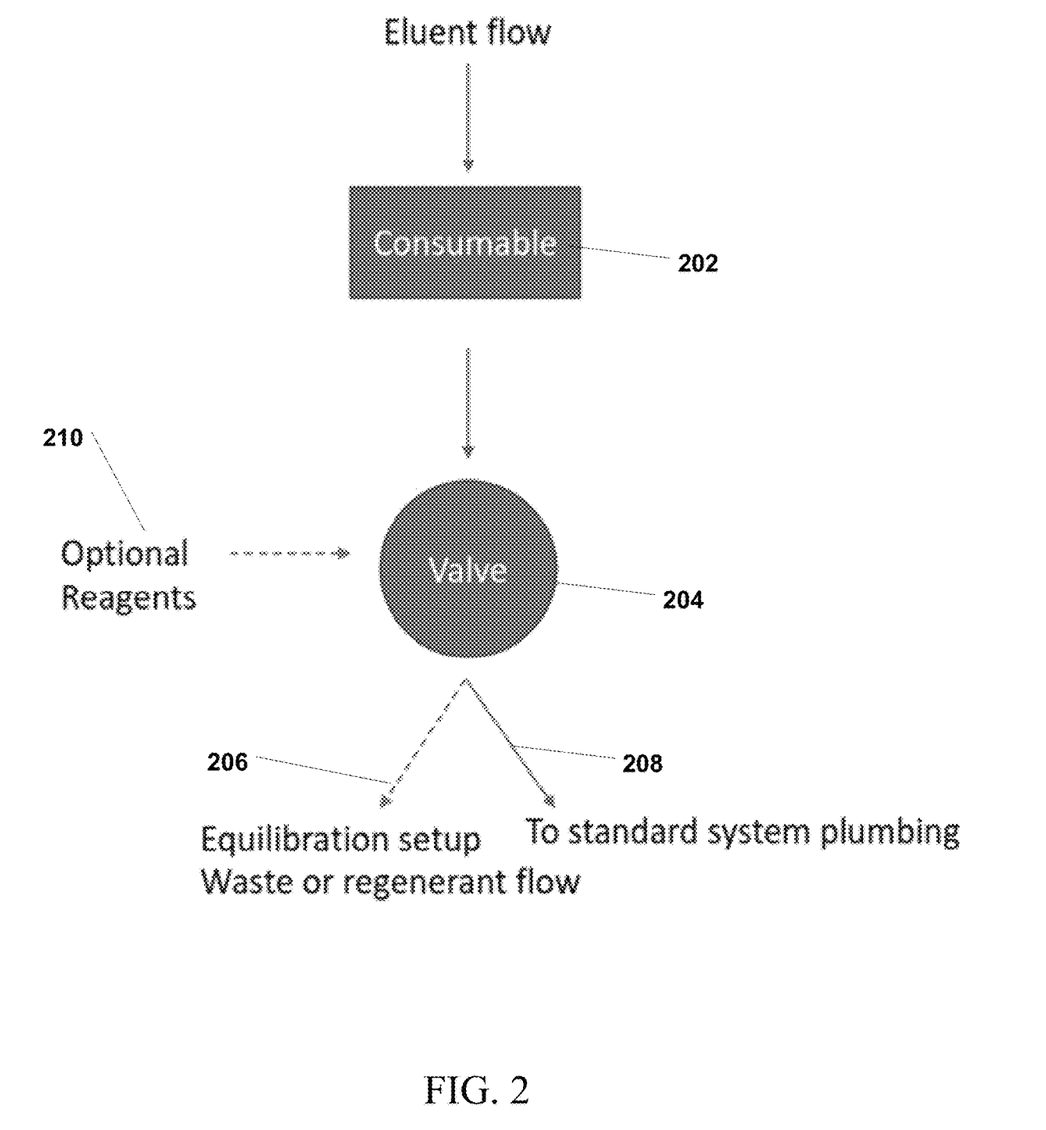
FIG. 2 illustrates a generalized valve scheme for an electrolytic consumable, in accordance with various embodiments.

Referring to FIG. 2, a consumable 202 that requires to be equilibrated is upstream from a valve 204. In a first position 206, valve 204 can direct the flow from the consumable to an equilibration setup and then route this to waste or as a water stream for regenerating a regenerant pathway for electrolytic devices. The second position 208 on the valve resumes normal plumbing or operation of the IC system. Thus, a valving scheme could enable an automated deployment of the ion chromatograph. The equilibration steps can be tailored to the consumable and require a specific setup for each individual consumable. Optional reagents 210 could be routed for electrolytic consumables to regenerate the regenerant pathway. The systems and methods disclosed herein can achieve these functions in an automated fashion with a method deployment from the chromatographic software that controls the system operation. Thus, hands on time and labor associated with these setups are significantly reduced or eliminated. By providing a valving setup that facilities equilibration of upstream consumables, overall equilibration time can be reduced allowing for the system to startup with minimal down time.

Figure 3:
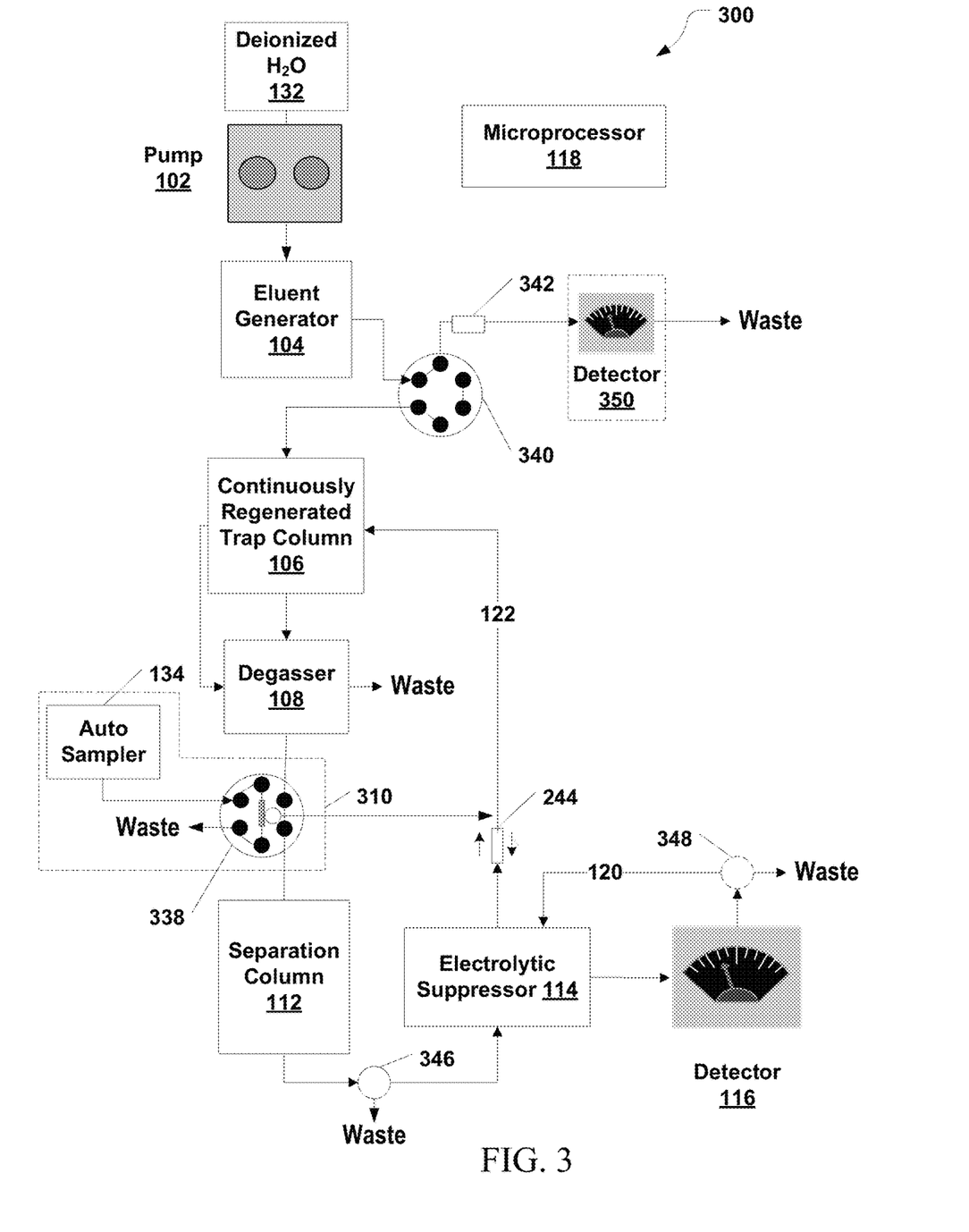
FIG. 3 illustrates an exemplary chromatography system, in accordance with various embodiments.

FIG. 3 shows an exemplary ion chromatography system 300. A six port two position valve 340 is installed between the eluent generator 104 and the continuously regenerated trap column 106 as shown. In a first position (not shown), the valve 340 routes the output of the eluent generator 104 to the continuously regenerated trap column 106. In a second position, the valve 340 routes the output of the eluent generator 104 to a flow restrictor 342, such as a flow restrictor rated at 2000 psi or other user selected value, and then diverts this to waste. The prescribed equilibration for the eluent generator 104 can be pursued and routed to waste and then the valve 340 can be switched to resume normal operation. In various embodiments, the waste from valve 340 can be routed to an optional detector 350. In this way equilibration of eluent generator 104 can be monitored to ensure sufficient equilibration of the eluent generator 104. Other waste streams can similarly be directed to optional detectors, such as detector 350 or separate detectors to monitor the waste stream and ensure satisfactory equilibration of each component.

Next the output stream from the continuously regenerated trap column 106 can be routed to the degasser 108 and then to the sample injector 310. The injection valve 338 can be a 7 port 3 position valve in place of the standard 6 port 2 position valve. The additional 7th port is connected to the pump flow in the 3rd position of the valve and could be leveraged during equilibration of the consumables. The 7th port can be connected to waste on the regenerant line 122. To ensure that the flow is routed in the correct direction a check valve 344 is deployed on the regenerant line between the electrolytic suppressor 114 out port and the continuously regenerated trap column 106 regenerant in port. Thus, this configuration could be used to regenerate the continuously regenerated trap column 106 with a regenerant flow established to provide water for the electrolysis reactions.

The injection valve in the 1st position can load the sample while the eluent is routed directly to the column. The injection valve in the 2nd position can inject the sample similar to the standard setup and the eluent is routed via the sample loop to the column for analysis. In the 3rd position the eluent that is pumped through the continuously regenerated trap column 106 is routed to the regenerant side of the continuously regenerated trap column 106 and to waste. This configuration would help the equilibration of the continuously regenerated trap column 106 before resuming normal operation in the 1st or 2nd position.

Next the eluent is routed to the chromatographic separation device 112 and then routed to a valve 346 which, in this embodiment, is shown as a three-port valve with two positions. In position one, the valve routes the eluent from the chromatographic separation device 112 to the electrolytic suppressor 114 eluent in port. In a second position, the eluent from the chromatographic separation device 112 is routed to waste. The second position is used to equilibrate the chromatographic separation device 112 prior to standard operation. The advantage of this setup is that any leachates from the chromatographic separation device 112 are flushed to waste rather than into the downstream consumables.

The suppressed eluent from the electrolytic suppressor 114 eluent out port is routed to a detector 116 and then routed to a three-port dual position valve 348. In a first position, the suppressed eluent is routed to the regenerant channel of the electrolytic suppressor 114 to provide water required for the electrolysis reactions. In a second position, the suppressed eluent from the eluent out port of the electrolytic suppressor 114 is routed through the detector 116 and is routed to waste. Upon installation, the electrolytic suppressor 114 can be equilibrated in this setup. An optional regenerant stream (not shown) can be deployed to flush the suppressor regenerant channels.

Another benefit of the embodiment of FIG. 3 is that when each consumable is routed to waste the downstream pressure can be easily obtained by subtracting from the total system pressure. Thus, the embodiment of FIG. 3 provides the consumable pressure contribution and could be used for troubleshooting purposes when the system pressure escalates due to a consumable issue. This can provide valuable diagnostic information. Also, a quick rinse of the consumable and routing it to waste can ensure good system performance.

Figure 4:
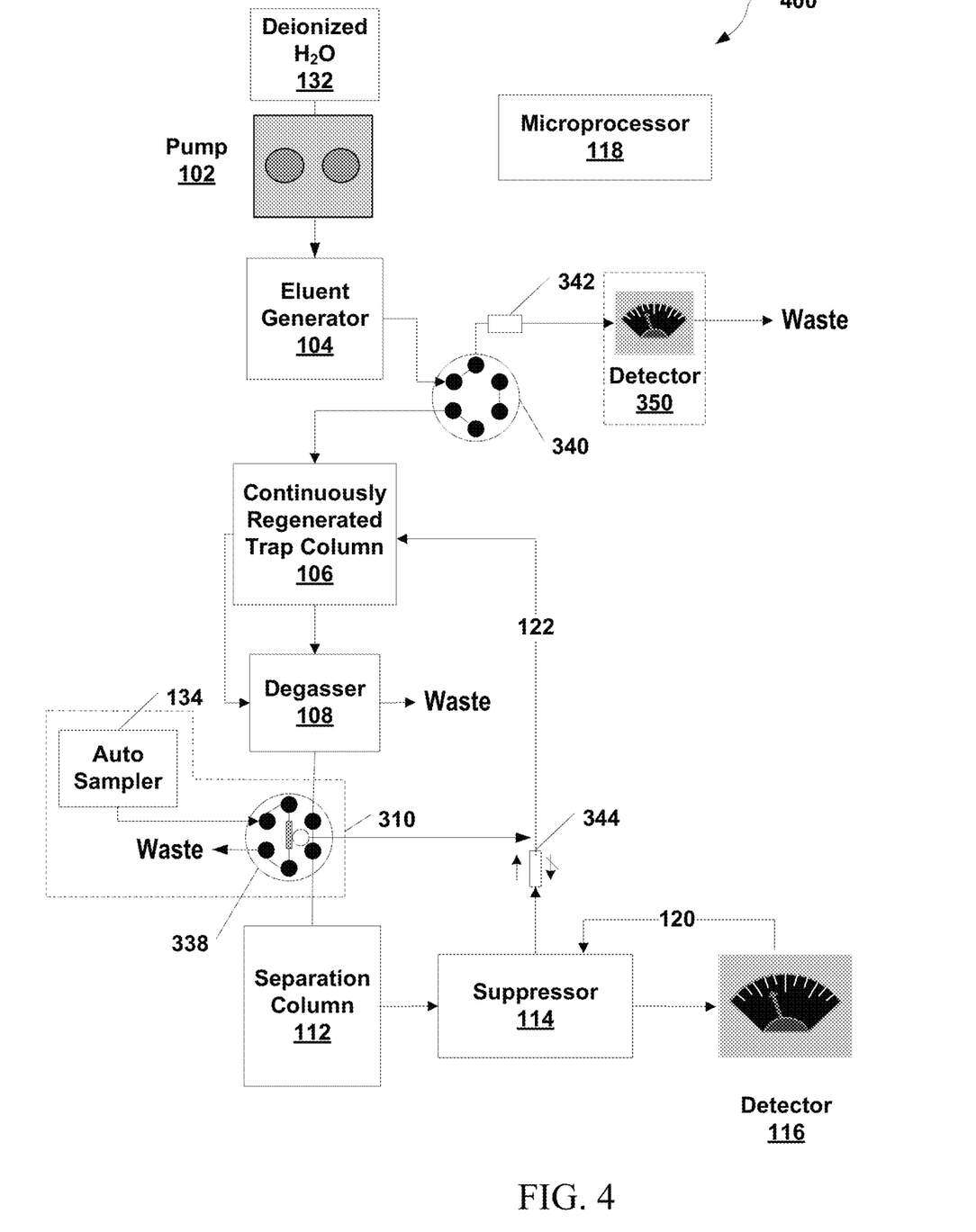
FIG. 4 illustrates an exemplary chromatography system, in accordance with various embodiments.

FIG. 4 shows a simplified setup where only two valves (valves 340 and 338) are deployed to allow for equilibration of the eluent generator 104 and the continuously regenerated trap column 106 as discussed previously. This setup may be useful when a) the columns do not leach out significantly to alter performance b) when the suppressor used is a chemical suppressor which would not require the setup of FIG. 3. Also, in cases where the user can pursue the equilibration of the column and the suppressor in a manual mode.

Figure 5:
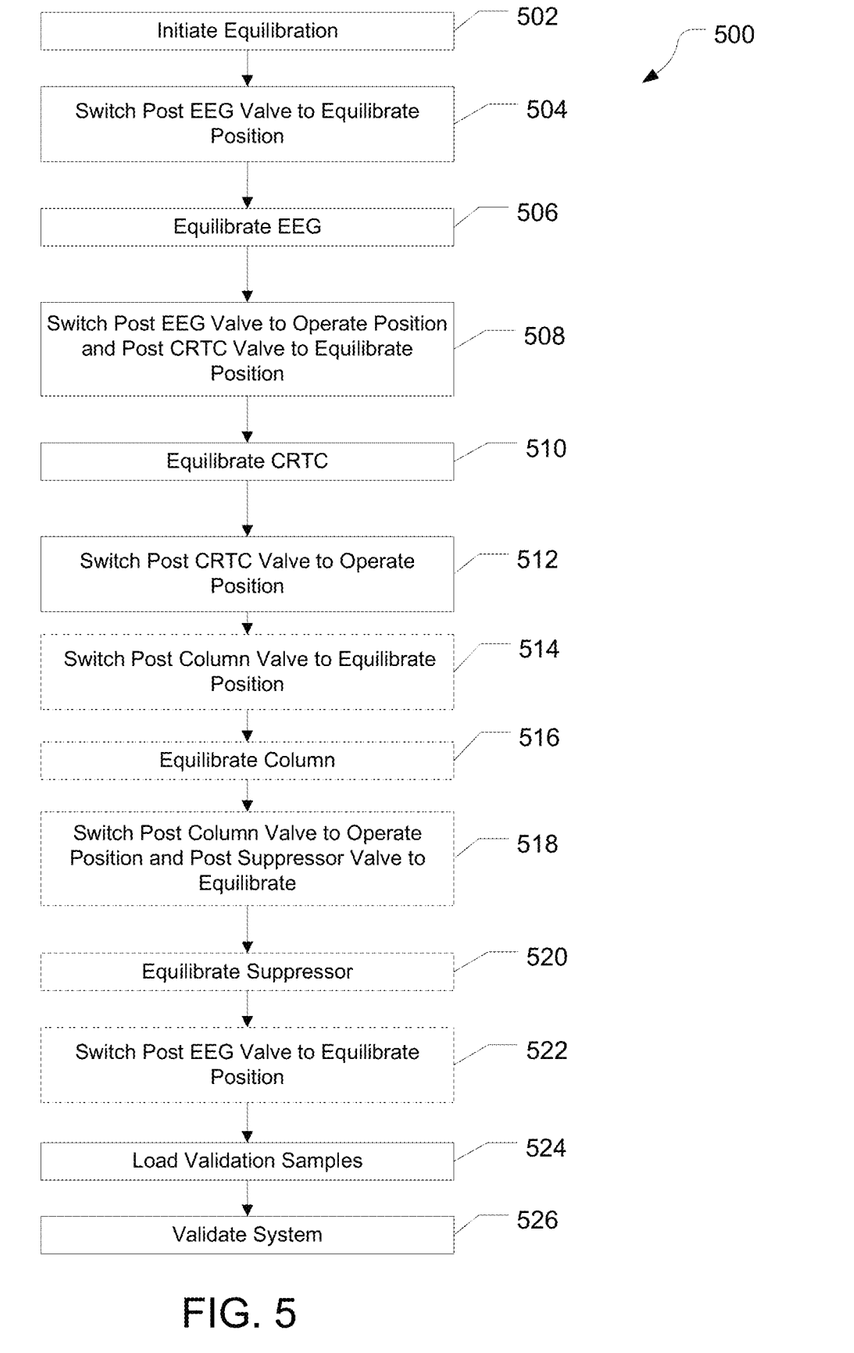
FIG. 5 illustrates an exemplary method of preparing a chromatography system for use, in accordance with various embodiments.

FIG. 5 shows a method 500 of preparing a chromatography system for use. At 502, equilibration of the system can be initiated. In various embodiments, a user interface can provide the user an option for equilibration of the system. A human user can initiate equilibration of the system through the user interface, such as by pressing a button. The equilibration can also be pursued in an automated fashion by programming the equilibration prior to starting the system and then resuming normal operation in a fully automated fashion.

Referring to FIG. 5, at 504, the system can switch a valve located after an electrolytic eluent generator, such as valve 340 of FIG. 3, to a equilibrate position. In various embodiments, the equilibrate position can direct the flow out of the electrolytic eluent generator to waste. At 506, the electrolytic eluent generator can be equilibrated. In various embodiments, a pump can supply deionized water to the eluent generator for an equilibration time according to established protocols. In various embodiments, the established protocols can be provided by the manufacturer of the chromatography system or the eluent generator, or the protocols can be provided by the user.

At 508, the system can switch the valve located after the eluent generator to a normal operating position and switch a valve located after the continuously regenerated trap column, such as valve 338 of FIG. 3, to an equilibration position. In various embodiments, the equilibration position can direct the flow downstream of the continuously regenerated trap column to a regenerate line, such as line 122 of FIG. 3, to provide a regenerant flow to the continuously regenerated trap column. At 510, the continuously regenerated trap column can be equilibrated. In various embodiments, a pump can supply deionized water to the eluent generator which can supply eluent to the continuously regenerated trap column for an equilibration time according to established protocols. At 512, the system can switch the valve located after the continuously regenerated trap column to a normal operating position.

In various embodiments, it may be desirable to equilibrate the separation column and/or the suppressor. In other embodiments, it may not be necessary to equilibrate the separation column and suppressor, such as if the separation column does not leach out significantly and/or when the suppressor is a chemical suppressor rather than an electrolytic suppressor. Optionally, at 514, the system can switch a valve located after the separation column, such as valve 346 of FIG. 3, to an equilibration position. In various embodiments, the equilibration position can direct the flow downstream of the separation column to waste. Optionally, at 516, the separation column can be equilibrated. In various embodiments, a pump can supply deionized water to the eluent generator which can produce an eluent flow to the separation column for an equilibration time according to established protocols.

Optionally, at 518, the system can switch the valve located after the separation column to a normal operating position and switch a valve located after the electrolytic suppressor, such as valve 348 of FIG. 3, to an equilibration position. In various embodiments, the equilibrate position can direct the flow out of the electrolytic suppressor to waste. Optionally, at 520, the electrolytic eluent generator can be equilibrated. In various embodiments, a pump can drive an eluent flow through the column and to the suppressor for an equilibration time according to established protocols. Optionally, at 522, the system can switch the valve located after the electrolytic suppressor to a normal operating position.

At 524, the system can prompt a human user or a robot to load validation samples and the human user can load the validation samples. In various embodiments, the sample can be loaded after equilibration of the electrolytic consumables. In other embodiments, the system may prompt the user and the user may load the samples at 502 when the equilibration is initiated which would eliminate the need for the human user to return to the chromatographic system between equilibration and validation. At 526, the system can perform a validation routine to ensure the system is operating within requirements.

Figure 6:
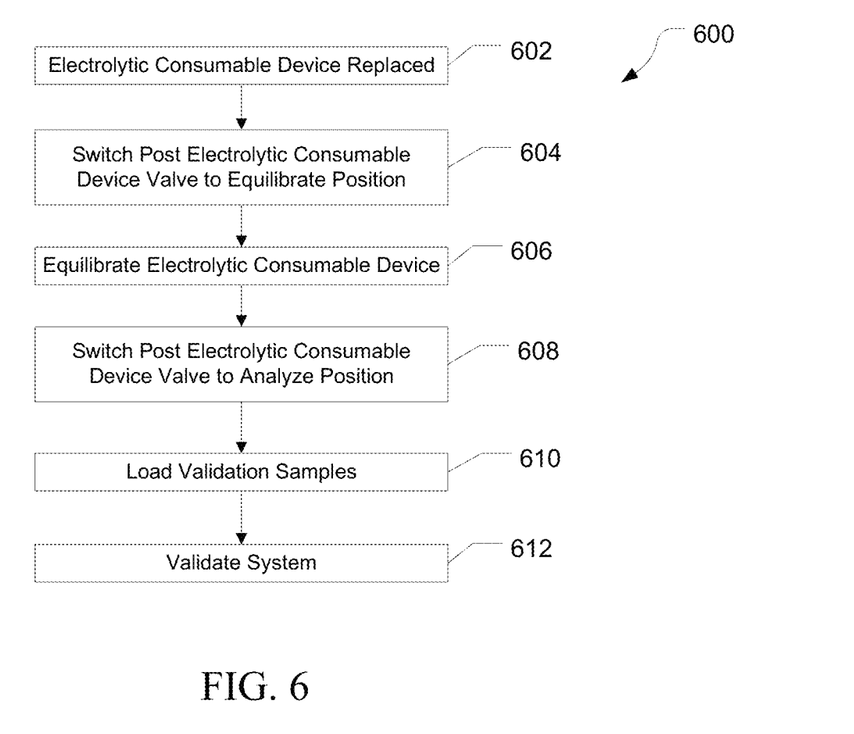
FIG. 6 illustrates an exemplary method of replacing an electrolytic consumable, in accordance with various embodiments.

In various embodiments, the system can measure the pressure after equilibration of each component to determine the pressure contribution of FIG. 6 shows a method 600 of preparing a chromatography system for use after replacement of an electrolytic consumable device. The electrolytic consumable device may be an electrolytic eluent generator, a continuously regenerated trap column, a separation column, an electrolytic suppressor, or the like. At 602, a human user can replace the electrolytic consumable device and initiate equilibration of the electrolytic consumable device. In various embodiments, the system can provide a user interface for initiating equilibration of the device and the human user can initiate equilibration, such as by selecting the device and pressing a button to initiate equilibration.

At 604, the system can switch a valve located downstream of the electrolytic consumable to an equilibrate position. In various embodiments, the equilibrate position can direct the flow out of the electrolytic consumable device to waste or to a regenerant line. At 606, the electrolytic consumable device can be equilibrated. In various embodiments, the system can cause a pump to drive a flow through the electrolytic consumable device for an equilibration time according to established protocols. In various embodiments, the established protocols can be provided by the manufacturer of the chromatography system or the eluent generator, or the protocols can be provided by the user. At 608, the system can switch the valve located downstream of the electrolytic consumable to a normal operating position.

At 610, the system can prompt a human user to load validation samples and the human user can load the validation samples. In various embodiments, the sample can be loaded after equilibration of the electrolytic consumable device. In other embodiments, the system may prompt the user and the user may load the samples at 602 when the equilibration is initiated which would eliminate the need for the human user to return to the chromatographic system between equilibration and validation. At 612, the system can perform a validation routine to ensure the system is operating within requirements.

What is claimed is:

1. A chromatography system comprising:
   an electrolytic eluent generator configured to electrolytically produce an eluent;
   a first valve configured to switch between an operating position which directs an output of the electrolytic eluent generator to a continuously regenerated trap column and a waste position which directs the output of the electrolytic eluent generator to waste;
   the continuously regenerated trap column configured to remove ionic contaminants from the eluent;
   a degasser configured to remove residual gas from the eluent;
   a sample injector including a sample injector valve assembly configured to switch between an operation mode which directs an output of the degasser to a separation column, a load mode which loads a sample onto the separation column, and a regenerant mode which directs the output of the degasser to a regenerant line;
   the separation column configured to chromatographically separate components of a sample;
   a suppressor configured to reduce the eluent conductivity; and
   a detector configured to detect the presence of components of the sample.

2. The chromatography system of claim 1, wherein the sample injector valve assembly includes a three position valve to switch between an operation position corresponding to the operation mode, a load position corresponding to the load mode, and a regenerant position corresponding to the regenerant mode.

3. The chromatography system of claim 1, wherein the sample injector valve assembly includes
   a second valve to switch between a first operate position which directs an output of the degasser to a third valve and a load position which directs the sample onto the separation column; and
   a third valve to switch between a second operate position which directs an output of the second valve to the separation column and a regenerant position which directs the output of the second valve to a regenerant line.

4. The chromatography system of claim 1, further comprising a check valve on the regenerant line.

5. The chromatography system of claim 1, further comprising a flow restrictor between the first valve and waste.

6. The chromatography system of claim 1, further comprising a controller, wherein the controller is configured to switch the first valve to the waste position during an electrolytic eluent generator equilibration time period.

7. The chromatography system of claim 6, wherein the controller is further configured to switch the second valve to the regenerant position during a continuously regenerated trap column equilibration time period.

8. The chromatography system of claim 1, further comprising a third valve configured to switch between an operating position which directs the output of the separation column to the suppressor and a waste position which directs the output of the separation column to waste.

9. The chromatography system of claim 8, further comprising a controller, wherein the controller is configured to switch the third valve to the waste position during a separation column equilibration time period.

10. The chromatography system of claim 1, wherein the suppressor is a chemical suppressor.

11. The chromatography system of claim 1, wherein the suppressor is an electrolytic suppressor.

12. The chromatography system of claim 11, further comprising a fourth valve configured to switch between an operating position which directs the output of the detector to a regenerant line and a waste position which directs the output of the detector to waste.

13. The chromatography system of claim 12, further comprising a controller, wherein the controller is configured to switch the fourth valve to the waste position during a suppressor equilibration time period.

14. A method comprising:
    switching a first valve to a waste position which directs the output of an electrolytic eluent generator to waste;
    flowing liquid through the electrolytic eluent generator for an electrolytic eluent generator equilibration time period;
    switching the first valve to an operating position which directs the output of an electrolytic eluent generator to a continuously regenerated trap column;
    switching a second valve downstream of the continuously regenerated trap column to a regenerant position which directs a downstream flow from the continuously regenerated trap column to a regenerant line;
    flowing liquid through the continuously regenerated trap column for a continuously regenerated trap column equilibration time period;
    switching the second valve to an operation position which directs the downstream flow to a separation column; and
    validating the operation of the chromatography system.

15. The method of claim 14 further comprising:
    switching a third valve to a waste position which directs the output of the separation column to waste;
    flowing liquid through the separation column for a separation column equilibration time period; and
    switching the third valve to an operating position which directs the output of the separation column to a suppressor.

16. The method of claim 15 wherein the suppressor is a chemical suppressor.

17. The method of claim 15 wherein the suppressor is an electrolytic suppressor.

18. The method of claim 17 further comprising:
    switching a fourth valve to a waste position which directs the output of a detector to waste;
    flowing liquid through a suppressor to the detector for a suppressor equilibration time period; and
    switching the fourth valve to an operating position which directs the output of the detector to a regenerant line.

19. The method of claim 18 further comprising providing an alternate regenerant flow to the suppressor during the suppressor equilibration time period.

* * * * *